US011842205B2

(12) United States Patent
Awadallah et al.

(10) Patent No.: US 11,842,205 B2
(45) Date of Patent: *Dec. 12, 2023

(54) NATURAL LANGUAGE TO API CONVERSION

(71) Applicant: Microsoft Technology Licensing, LLC, Redmond, WA (US)

(72) Inventors: Ahmed Hassan Awadallah, Redmond, WA (US); Miaosen Wang, Sammamish, WA (US); Ryen White, Woodinville, WA (US); Yu Su, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,701

(22) Filed: Aug. 30, 2022

(65) Prior Publication Data
US 2022/0413874 A1    Dec. 29, 2022

Related U.S. Application Data

(63) Continuation of application No. 15/919,209, filed on Mar. 13, 2018, now Pat. No. 11,474,836.

(51) Int. Cl.
*G06F 9/448*      (2018.01)
*G06F 8/30*       (2018.01)
(Continued)

(52) U.S. Cl.
CPC .............. *G06F 9/448* (2018.02); *G06F 8/30* (2013.01); *G06F 9/54* (2013.01); *G06F 40/279* (2020.01);
(Continued)

(58) Field of Classification Search
CPC ... G06F 9/448; G06F 8/30; G06F 9/54; G06F 40/279; G06N 20/00; G06N 3/045;
(Continued)

(56) References Cited

U.S. PATENT DOCUMENTS 5,477,451 A *  12/1995 Brown ................... G06F 40/49
                                                        704/9
9,015,730 B1 *  4/2015 Allen ...................... G06F 9/466
                                                        719/310
(Continued)

OTHER PUBLICATIONS

"Notice of Allowance Issued in European Patent Application No. 19712379.7", dated Aug. 25, 2022, 2 Pages.

*Primary Examiner* — Sonia L Gay
(74) *Attorney, Agent, or Firm* — Rainier Patents, P.S.

(57) ABSTRACT

Representative embodiments disclose mechanisms to map natural language input to an application programming interface (API) call. The natural language input is first mapped to an API frame, which is a representation of the API call without any API call formatting. The mapping from natural language input to API frame is performed using a trained sequence to sequence neural model. The sequence to sequence neural model is decomposed into small prediction units called modules. Each module is highly specialized at predicting a pre-defined kind of sequence output. The output of the modules can be displayed in an interactive user interface that allows the user to add, remove, and/or modify the output of the individual modules. The user input can be used as further training data. The API frame is mapped to an API call using a deterministic mapping.

20 Claims, 12 Drawing Sheets

(51) Int. Cl.
*G06F 9/54* (2006.01)
*G06F 40/279* (2020.01)
*G06N 20/00* (2019.01)
*G06N 3/04* (2023.01)
*G10L 15/06* (2013.01)
*G06N 3/082* (2023.01)
*G06N 3/044* (2023.01)
*G06N 3/045* (2023.01)

(52) U.S. Cl.
CPC .............. *G06N 3/04* (2013.01); *G06N 3/044* (2023.01); *G06N 3/045* (2023.01); *G06N 3/082* (2013.01); *G06N 20/00* (2019.01); *G10L 15/063* (2013.01)

(58) Field of Classification Search
CPC .......... G06N 3/044; G06N 3/04; G06N 3/082; G10L 15/063
See application file for complete search history.

(56) References Cited

U.S. PATENT DOCUMENTS

| | | | |
|---|---|---|---|
| 10,922,357 B1* | 2/2021 | Chennuru | G06F 16/2457 |
| 11,093,110 B1* | 8/2021 | Bossio | G10L 15/26 |
| 2017/0161262 A1* | 6/2017 | Bhatt | G06F 40/237 |

* cited by examiner

NATURAL LANGUAGE TO API CONVERSION

FIELD

This application relates generally to natural language processing. More specifically, in some aspects, this application relates to using a trained machine learning model to convert natural language input into an application programming interface call.

BACKGROUND

The rapidly increasing ubiquity of computing puts a great demand on the next-generation human-machine interface. Natural language interface is widely believed to be a promising direction. Users want to control a wide variety of devices, programs, applications and so forth using natural language phrasing, whether spoken, typed, or input in other ways.

It is within this context that the present embodiments arise.

DETAILED DESCRIPTION

Figure 1:
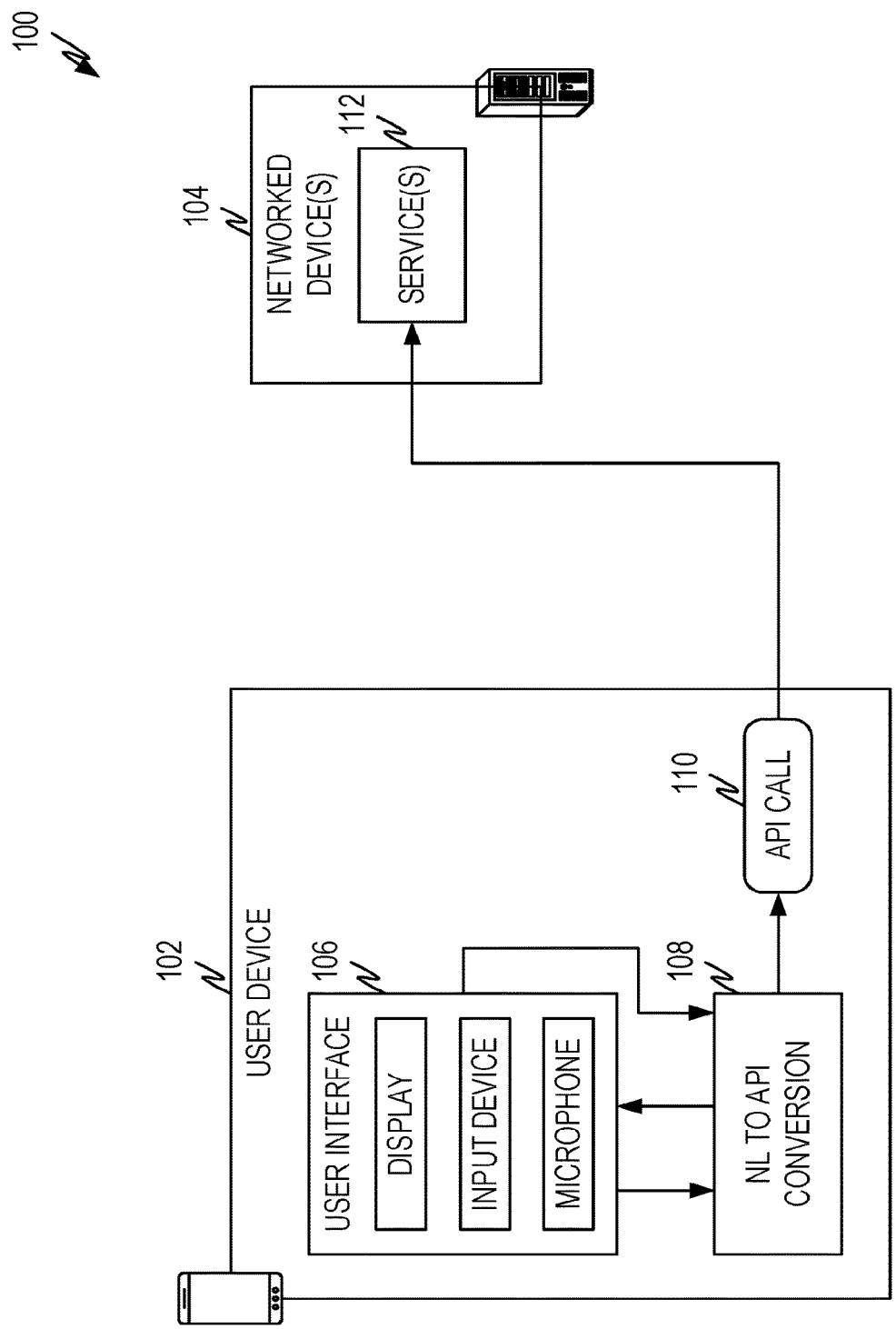
FIG. 1 illustrates a representative system architecture according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

As natural language becomes a more common interface method into computing devices, more users want to utilize natural language to interface and control virtually everything that a user can do with a computing device. Unfortunately, many, if not most, applications, programs, services, digital assistants, devices (such as the so called "internet of things"), and other tools (collectively referred to herein as programs) a user utilizes on a computing device are not natural language enabled. For example, some databases and programs expect input in a particular format and/or language. Even for those programs that are natural language enabled, the ability of a program to recognize natural language and convert into a user desired action or actions can be uneven and vary from program to program.

While natural language interfaces to programs can be missing or uneven, almost every program exposes one or more application programming interfaces (APIs) that allow other programmatic entities to interface with the program and accomplish desired activities through the program. Embodiments of the present disclosure convert natural language input into appropriate API calls. Such a conversion allows a uniform experience for users as they utilize programs to accomplish desired tasks. This also allows programs that are not natural language enabled to be controlled by natural language.

The core challenge of natural language interfaces is to map natural language utterances (commands) from users to a formal meaning representation, such as an API. Traditional approaches have relied on rule-based models, which use a set of rules to map utterances into API calls. However, such models are typically brittle and do not handle the flexibility and ambiguity of natural languages. Furthermore, often such models are hand coded and if a user uses a new utterance, or if a developer needs to add a new utterance or API, a developer must add the new utterance and associated API into the model.

Statistical approaches have also been tried in which a machine learning model is trained with a large number of manually designed features. However, this is very time consuming and requires design for every natural language interface and for every application domain, which can limit their applicability. Furthermore, such approaches usually result in a binary decision, the model correctly interpreted what the user wanted or the model didn't correctly interpret what the user wanted. This presents a "black box" problem to the user since if the model did not correctly interpret what the user wanted, the user cannot correct the incorrect portion of what was recognized and the user must simply try again.

This can be particularly frustrating in terms of speech input where a user says the same phrase again and again and the device responds with an unwanted interpretation again and again. This typically results in the user simply abandoning any attempt and approaching the problem in a different fashion.

The methodologies and embodiments disclosed herein can be applied to convert natural language into any set or type of APIs, including local APIs, remote procedure calls, Web APIs, and so forth. The natural language to API conversion happens by way of a trained machine language model that breaks down a sequence-to-sequence machine learning model into smaller prediction units called "modules". Each module is highly specialized at predicting a pre-defined kind of sequence output. One large benefit is that the output of the individual prediction modules can be easily mapped into user understandable concepts. These can be presented to the user in some embodiments to allow for user verification and correction, if necessary. This avoids the "black box" problems of traditional approaches. It also allows new user interaction mechanisms that increase the efficiency and accuracy of natural language interactions with a device. Furthermore, the model is able to perform in a manner not previously enabled by any natural language to API conversion approaches.

Thus, the disclosed embodiments improve operation of the machine by enabling greatly improved interaction between users and devices. The disclosed embodiments also improve operation of the machine by enabling natural language interaction with programs that are not natural language enabled, thus providing new modes of user interaction with existing programs. The disclosed embodiments also improve operation of the machine by enabling user interaction and correction with natural language interpretations of received natural language input. This also improves operation of the machine through quicker training and better accuracy for the machine learning models used herein.

Description

FIG. 1 illustrates a representative system architecture 100 according to some aspects of the present disclosure. In this architecture, the natural language (NL) to API conversion happens on a user device 102. The user device 102 receives one or more NL utterances via user interface 106. NL utterances can comprise a phrase, a sentence, or other NL input. The NL input can come in the form of text, speech, or other NL input. The user interface 106 can comprise a display such as a touch screen or other display, an input device such as a keyboard, a virtual keyboard displayed on a touch screen, and so forth as well as additional input mechanisms such as a microphone for speech input. The user interface 106 can also comprise a speaker or other audio output device so that NL to API conversion interactivity using audio can be implemented as described herein. Other aspects of a user device 102 are discussed in FIG. 11 below.

The NL utterance is sent to the NL to API conversion process 108. The NL to API conversion 108 comprises a trained machine learning model as described below. In one embodiment, the trained machine learning model comprises a sequence to sequence model where the decoder aspect comprises a plurality of specialized decoders, each trained to recognize a pre-defined kind of sequence output from the encoder. These specialized decoders are referred to herein as modules. The machine learning model is described in greater detail below. Conversion of NL utterances to APIs is described more completely below.

Because the decoder modules are trained to recognize a pre-defined kind of sequence output, they map to portions of the NL utterance(s) and thus the kind of recognized sequence can be easily described to a user. This presents an opportunity for user interactivity that avoids the black box problem described above. The recognized NL utterance can be presented to the user via the user interface in text, sound, and/or in another format, and/or combinations thereof. The user can then correct any portions of the utterance that have been incorrectly interpreted and can then submit the corrected recognized utterance and the NL to API conversion 108 can then create the appropriate API call 110. The interactivity is further discussed below.

Such interactivity does not need to be part of all embodiments of the present disclosure. It is simply an option in some embodiments that has certain benefits as described herein.

The NL to API conversion 108 can be implemented via hardware, such as in a neural network chip, which is designed to execute a trained machine learning model, or via a combination of hardware and software such as where executable instructions are executed via one or more hardware processors, or both.

The API call 110 is a formatted API call that can then be used by the user device, by an application or program on the user device, or by another programmatic and/or hardware entity to perform the API call. For example, if the API call 110 is a Web API designed to access a web service 112 from one or more networked device 104, the user device can use the API call 110 to access the service 112 via the Web API call. Similarly, the API call 110 can be used to access a local API, a remote procedure call, or other API.

Figure 2:
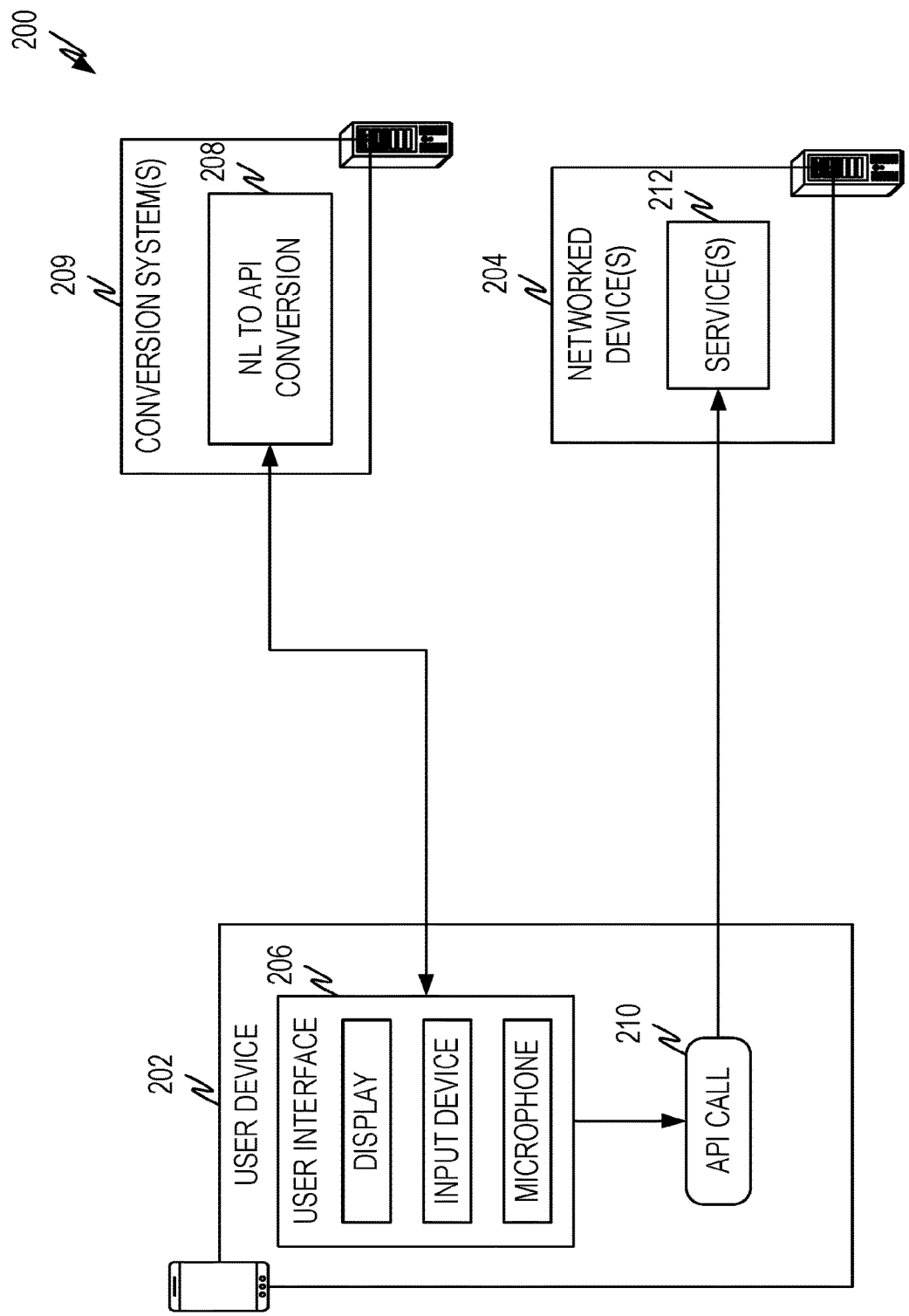
FIG. 2 illustrates another representative system architecture according to some aspects of the present disclosure.

FIG. 2 illustrates another representative system architecture 200 according to some aspects of the present disclosure. This architecture 200 illustrates an example of where the NL to API conversion 208 resides off the user device 202 and is reached, for example, as a service or other API. The user device 202 comprises a user interface 206 like previously described in conjunction with FIG. 1. The device receives NL utterance(s) via the user interface. The NL utterances are passed to the conversion system(s) 209 where the NL to API conversation 208 resides. NL to API conversion 208 is implemented and performed as described herein.

For embodiments that implement interactivity as described herein, the conversion system 209 sends the information to the user device 202 that is needed to present the output of the various specialized decoder modules via the user interface and receive any user corrections as discussed herein. The user corrections (if any) are sent back to the NL to API conversion 208 and the NL to API conversion 208 creates the API call 210, as described below, and returns the API call 210 to the user device 202 where it is utilized as described.

For embodiments that do no implement interactivity in the conversion process, the NL to API conversation 208 returns the created API call 210 to the user device 202 where it is utilized.

Figure 3:
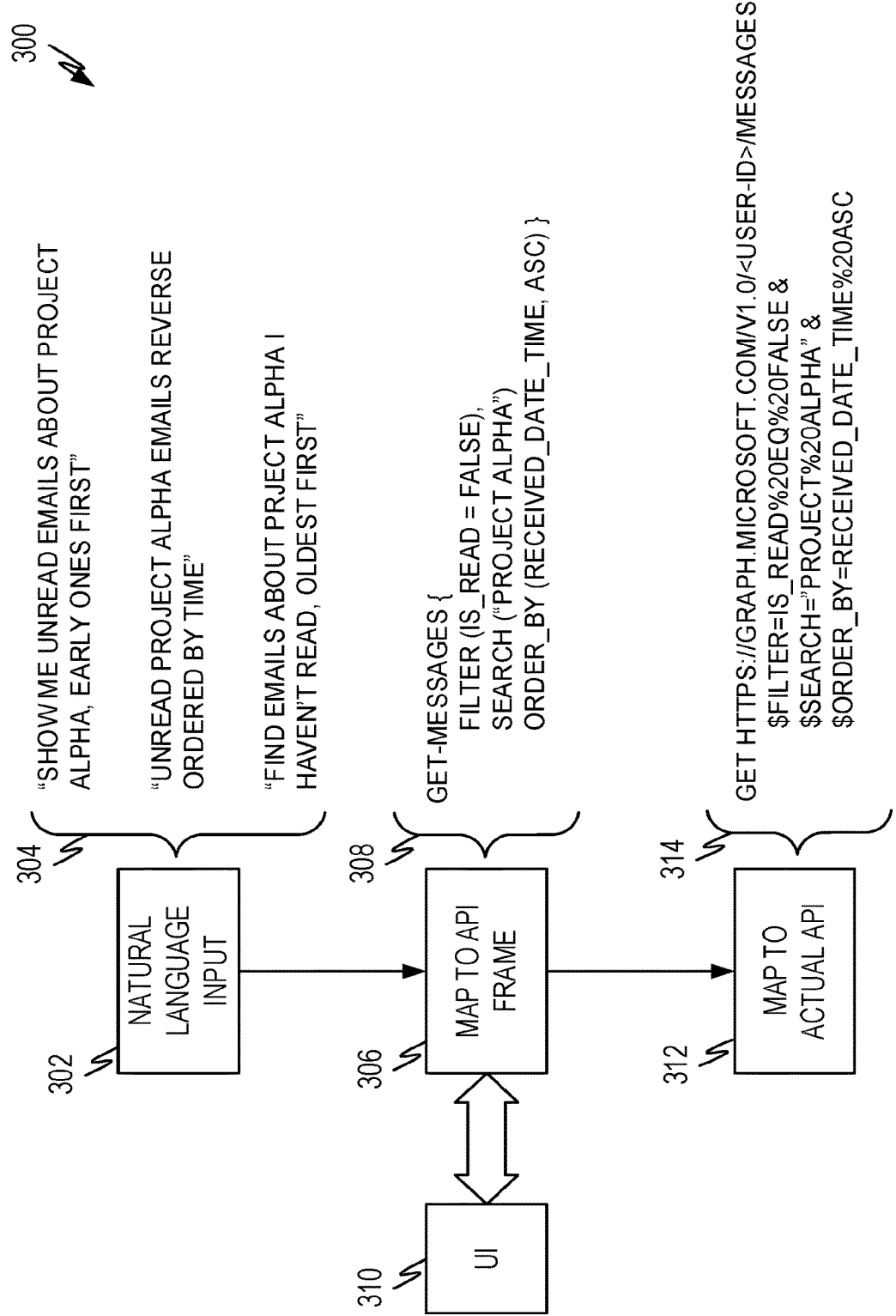
FIG. 3 illustrates a representative flow diagram for conversion of natural language input into an application programming interface (API) call according to some aspects of the present disclosure.

FIG. 3 illustrates a representative flow diagram 300 for conversion of natural language input into an application programming interface (API) call according to some aspects of the present disclosure. This flow diagram 300 presents the high level processes and the details of the conversion are described below.

There are three main operations that are performed to convert NL utterances to an output API call. The first operation is to receive the NL utterances as illustrated by operation 302. NL utterances are received by the user device such as user device 102 or 202 via a user interface such as user interface 106 or 206. NL utterances can be received in a variety of formats. For example, the user device can receive NL utterances in a speech format, such as via a microphone. Additionally, or alternatively, NL utterances can be received in a text format. Received NL utterances can be converted to a standard format such as text for processing by the NL to API conversion process. For example, NL utterances received in a speech format can be converted to text by a speech-to-text conversion process. Numerous speech-to-text conversion processes are known and any such known processes can be used as part of the conversion to text format.

Additionally, or alternatively, the received NL utterances can be pre-processed to eliminate sources of error. For example, spelling can be corrected, stop words (e.g., words that hold no semantic meaning but are part of a grammatically correct NL utterance) can be added or removed, and/or other such pre-processing. The purpose of any such pre-processing is to place the NL utterance(s) into a format where conversion is ready to take place.

Users can use a variety of NL utterances to express the same intent. Intent is what the user is attempting to achieve through the NL utterance. For example, suppose the user's intent is to find all the emails about project Alpha and wants them displayed so that the emails with the oldest time stamp are displayed first. FIG. 3:304 illustrates sample NL utterances that may be utilized by the user to express this intent including:

"Show me unread emails about project Alpha, early ones first;"

"Unread project Alpha emails reverse ordered by time;"

"Find emails about project Alpha that I haven't read, oldest ones first."

The NL utterances are first mapped to an API frame by a machine learning model. As discussed below, embodiments of the present disclosure can utilize a sequence to sequence model. An API frame specifies the major items in an API (name, parameters, values, and so forth) without any particular API formatting or other information such as protocol information that may be needed to actually make the API call. The API frames used in the conversion are derived from the set of APIs to which NL utterances are mapped. For example, a Web API call may look something like:

```
GET https://service.domain.com/v1.0/<user-
id>/messages?$filter=isRead%20eq%20FALSE&$search="Top%20Project"$orderby=receiv
    edDateTime%20asc
```

Such an API call includes particular formatting, protocol related information, conventions and so forth needed to make an actual Web API call. An API frame specifies the major items in an API (name, parameters, values, and so forth) without any particular API formatting or other information such as protocol information that may be needed to actually make the API call. For example, an API frame for the above GET API call may be something like:

```
GET-Messages {
    Filter (isRead = FALSE),
    Search ("Top Project"),
    OrderBy (receivedDateTime, asc) }
```

The set of API frames used in the mapping of NL utterances 302 to API frame 306 is derived by first considering the set of APIs that will be recognized (set of recognized APIs) by the NL to API conversion process. A set of API frames can be derived from each API in the set of recognized APIs. This set of API frames then represents the possible outputs of the sequence to sequence model as it converts the NL utterance 302 into the API frame 306.

The set of API frames also determine the parameter types that the sequence to sequence model recognizes from the NL utterances. For example, the paper "Roy T. Fielding and Richard N. Taylor, *Architectural styles and the design of network-based software architectures*, University of California, Irvine Doctoral dissertation, 2000," describes the REST architectural style for APIs. APIs that adhere to the REST architectural style have the API parameter types specified in Table 1.

TABLE 1

API Parameter Types

| Parameter Type | Description |
| --- | --- |
| SEARCH (string) | Search for resources containing specific keywords |
| FILTER (BoolExpr) | Filter by the criteria specified by the Boolean expression, e.g., isRead = False |
| ORDERBY (Property, Order) | Sort resources on a property in ascending ('asc') or descending ('desc') order |
| SELECT (Property) | Instead of the full resources, return resources selected by the specified property |
| COUNT ( ) | Count the number of matched resources |
| TOP (Integer) | Return the first number of resources specified by the integer value |

Other API architectures can lead to a different set of parameter types.

The parameter types in the set of API frames influence how the decoder of the sequence to sequence model used in the converter is factored into modules. This is explained in greater detail below. In summary, the decoder can be factored so that each module recognizes one parameter type and/or one API.

In the example of FIG. 3, the NL utterances 304 are mapped into the API frame 308. As described above and in greater detail below, the output of the modules can form the basis for user interactivity to correct any mistakes in converting the NL utterances 304 into the API frame 308. This is accomplished via the user interface 310 as described in greater detail below.

Once the NL utterance 304 is mapped into the API frame 308 by the NL to API conversion process 306, the API frame 308 is mapped into an API 314. This is accomplished through a set of deterministic mapping rules 312. For example, a parser can take the different pieces of the API frame 308 and, utilizing a set of deterministic mapping rules, map each piece of the API frame 308 to a corresponding piece of the API call. This process is illustrated in greater detail in FIG. 7.

Figure 4:
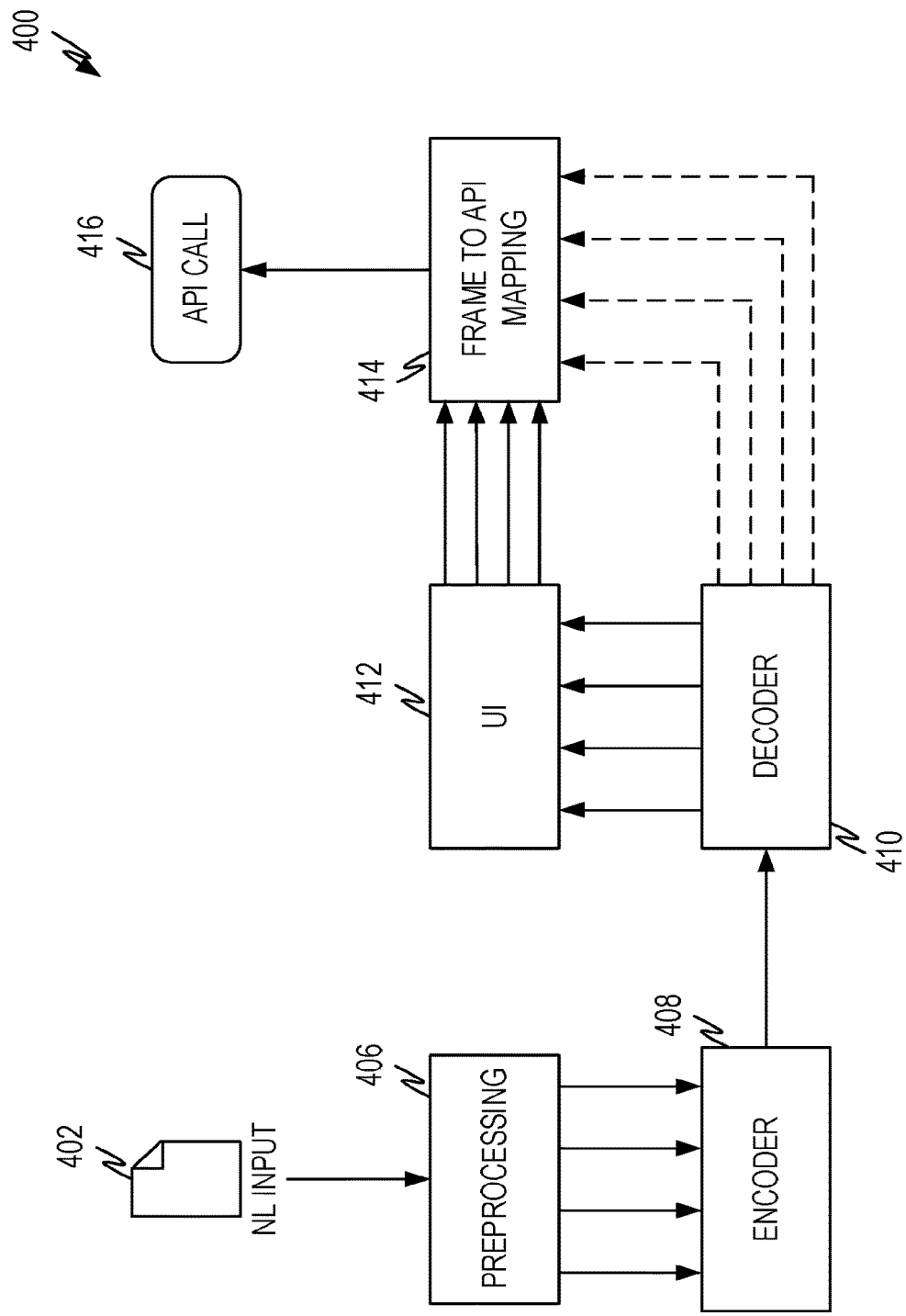
FIG. 4 illustrates a representative flow diagram for conversion of natural language input into an API call using a machine learning model according to some aspects of the present disclosure.

FIG. 4 illustrates a representative flow diagram 400 for conversion of natural language input into an API call using a machine learning model according to some aspects of the present disclosure. The flow diagram 400 can implement, for example, the process illustrated in FIG. 3.

NL utterances 402 is received by the system as illustrated herein. Operation 406 represents any pre-processing that happens on the NL utterances such as conversion from one format to another (e.g., speech to text), addition and/or removal of stop words, spelling correction, stemming, and/or any other type of pre-processing that is desired to prep the NL utterances for the initial conversion to the API frame.

A trained machine learning algorithm is utilized to convert the NL utterances into an API frame. The machine learning problem can be characterized as, Given an input utterance of x={$x_1, x_2, \ldots, x_m$}, where $x_i$ is the $i^{th}$ term in the input utterance, map x to the corresponding linearized API frame y={$y_1, y_2, \ldots, y_n$} where $y_j$ is the $j^{th}$ aspect of the API frame. This type of problem can be solved by a variety of trained machine learning models. One suitable model is a sequence to sequence neural model. For an input sequence x={$x_1, x_2, \ldots, x_m$}, the sequence to sequence neural model estimates the conditional probability distribution p(y|x) for all possible output sequences y={$y_1, y_2, \ldots, y_n$}. The lengths m and n can be different, and both of them can be varied. The encoder 408 and decoder 410 of FIG. 4 represent an illustrative example of the sequence to sequence neural model.

The encoder 408 is implemented as a bi-directional recurrent neural network (RNN), first encodes x into a sequence of state vectors ($h_1, h_2, \ldots, h_m$). If $\phi$ is a randomly initialized word embedding layer that embeds every word into a low-dimensional vector, the state vectors of the forward RNN and the backward RNN are respectively computed as:

$$\vec{h}_i = GRU_{fw}(\phi(x_i), \vec{h}_{i-1}) \quad (1)$$

$$\overleftarrow{h}_i = GRU_{bw}(\phi(x_i), \overleftarrow{h}_{i+1}) \quad (2)$$

Where the gated recurrent unit (GRU) is a hidden activation function. A suitable function is defined in the paper "Kyunghyun Cho, Bart van Merrienboer, Calar Gulcehre, Dzmitry Bandanau, Fethi Bougares, Holger Schwenk, and Yoshua Bengio, *Learning Phrase Representations using RNN Encoder-Decoder for Statistical Machine Translations*, Proceedigns of Conference on Empirical Methods in Natural Language Processing, 1724-1734, 2014." This reference defines a type of hidden activation function that is similar to that used in LSTM machine learning models, but that may be simpler to compute and implement. The hidden activation function includes a reset gate, so that the previous hidden state can be ignored. When computing the activation of the $j^{th}$ hidden unit, the reset gate $r_j$ is computed by:

$$r_j = \sigma([W_r x]_j + [U_r h_{t-1}]_j) \quad (3)$$

Where $\sigma$ is the logistic sigmoid function and $[\bullet]_j$ denotes the $j^{th}$ element of a vector. x and $h_{t-1}$ are the input and previous hidden state, respectively. $W_r$ and $U_r$ are weight matrices which are learned.

The update gate $z_j$ is computed by:

$$z_j = \sigma([W_z x])_j + [U_z h_{t-1}]_j) \quad (4)$$

Where mutatis mutandis the elements are defined as above. The actual activation of the proposed unit $h_j$ is computed by:

$$h_j^t = z_j h_j^{t-1} + (1-z_j) \tilde{h}_j^t \quad (5)$$

Where $$\tilde{h}_j^t = \phi([Wx]_j + [U(r \odot h_{t-1})]_j) \quad (6)$$

In this formulation, when the reset gate is close to 0, the hidden state is forced to ignore the previous hidden state and reset with the current input only. This effectively allows the hidden state to drop any information that is found to be irrelevant later in the future, thus allowing a more compact representation.

On the other hand, the update gate controls how much information from the previous hidden state will carry over to the current hidden state. This acts similarly to the memory cell in a LSTM neural network and helps the RNN to remember long-term information.

As each hidden unit has separate reset and update gates, each hidden unit will learn to capture dependencies over different time scales. Those units that learn to capture short-term dependencies will have update gates that are the most active.

The forward and backward state vectors of the RNN are concatenated, $h_i = [\vec{h}_i, \overleftarrow{h}_i]$, i=1, ..., m.

When the decoder 410 is implemented as a unitary decoder without factored decoder modules, the decoder is an attentive RNN, which will generate the output tokens one at a time. The state vector of the decoder is denoted as ($d_1, d_2, \ldots, d_n$). The attention takes the form of additive attention. For the decoding step j, the decoder is defined as:

$$d_0 = \tanh\left(W_0\left[\vec{h}_m, \overleftarrow{h}_1\right]\right) \quad (7)$$

$$u_{ji} = v^T \tanh(W_1 h_i + W_2 d_j) \quad (8)$$

$$\alpha_{ji} = \frac{u_{ji}}{\sum_{i'=1}^{m} u_{ji'}} \quad (9)$$

$$h'_j = \sum_{i=1}^{m} \alpha_{ji} h_i \quad (10)$$

$$d_{j+1} = GRU\left(\left[\phi(y_j), h'_j\right], d_j\right) \quad (11)$$

$$p(y_i|x, y_{1:j-1}) \propto e^{\left(U\left[d_j, h'_j\right]\right)} \quad (12)$$

Where $W_0, W_1, W_2$, v and U are model parameters. The decoder first calculates normalized attention weights $a_{ji}$ over encoder states and gets a summary state $h'_j$. The summary state is then used to calculate the next decoder state $d_{j+1}$ and the output probability distribution $p(y_i|x, y_{1:j-1})$. During training, the sequence $y_{1:j-1}$ is supplied using the "gold" output sequence. During testing, it is generated by the decoder.

The results of the decoder can be presented to the user in a user interface (UI) 412 to allow for user interactivity for correction, modification, and/or acceptance of the API frame. A unitary decoder architecture, such as been described above, do not allow the fine-grained interactivity that factored decoder architectures allow. This is because each prediction of the unitary decoder $y_j$ is based on a complex computation involving the whole input sequence x and all previous output tokens $y_{1:j-1}$. As such, it is basically a black box and is unable to provide the fine-grained interactivity of the factored decoder architectures.

A UI for the factored decoder architectures is presented below. For the unitary decoder architecture, the UI 412 allows the user to verify the result (e.g., the entire API frame). As an alternative, the same UI for the factored decoder architecture that is described in greater detail below can be presented and the user can modify, edit, or approve the various aspects of the API frame.

Once any user input is received via UI 412, or if no information is presented to the user because no interactivity is used and/or desired, the API frame to API call mapping 414 is performed using deterministic mapping rules as described below. The result is an API call 416 which includes all the necessary formatting and other information needed to make the associated API call.

Figure 5:
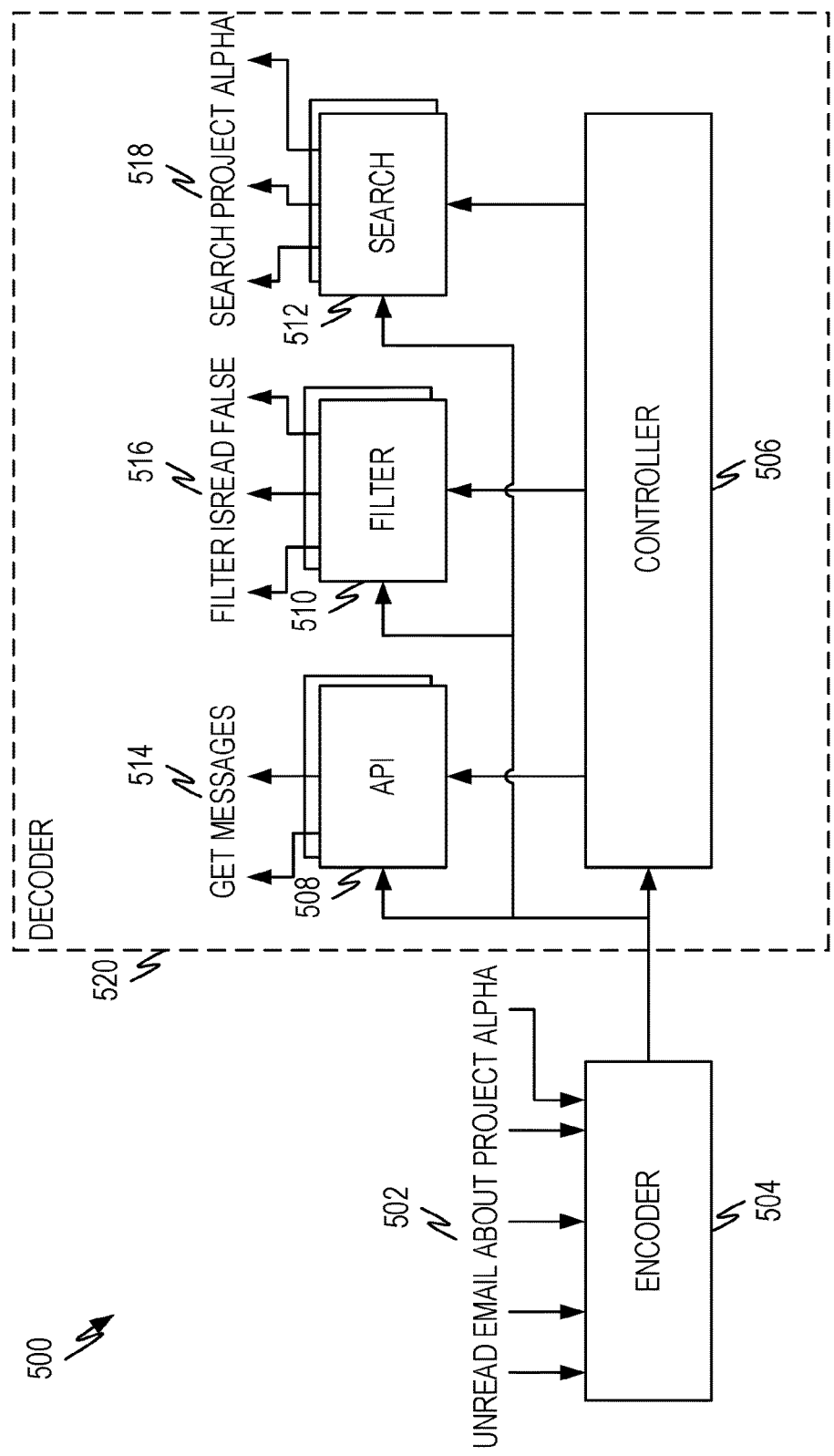
FIG. 5 illustrates a representative flow diagram for conversion of natural language input into an API frame using a machine learning model according to some aspects of the present disclosure.

FIG. 5 illustrates a representative flow diagram 500 for conversion of natural language input into an API frame using a machine learning model according to some aspects of the present disclosure. In this architecture, the decoder 520 is factored into decoder modules, each of which is trained to recognize a pre-defined kind of input sequence.

In the architecture of FIG. 5, an input 502 is received by the encoder 504. The encoder 504 is implemented and operates in the same fashion as the encoder 408 of FIG. 4 which has been described above. The encoder 504 is implemented as a bi-directional recurrent neural network (RNN), first encodes x into a sequence of state vectors ($h_1$, $h_2$, ..., $h_m$).

To enable more fine-grained interaction with the API frame, the decoder 520 comprises a plurality of decoder modules 506, 508, 510, 512. Each module is specialized (e.g., trained) at predicting a pre-defined kind of output. In other words, each is trained to recognize a specific portion of the API frame by reading the input NL utterance as encoded by the encoder 504. Because the modules 508, 510, 512 are associated with a particular portion of the API frame, users can easily understand the prediction of each module and can interact with the system at the module level.

A module in the decoder is a specialized neural network which is designed to fulfill a specific sequence prediction task. When factoring decoders into modules, the factoring occurs based on the set of API frames that should be the set of possible output frames for the decoder 520. For example, consider a set of API frames that are designed to interact with lights and other internet of things (IOT) devices within a home. These devices can be controlled, for example, using a hub via voice control, text control, and so forth. Suppose that the set of API frames are:

1. GET-Status {
   device (deviceID),
   location (Location) }
2. SET-Status {
   device (deviceID),
   status (isON) }
3. SET-Status {
   device (deviceID),
   status (isONLINE) }

These API frames can be set to correspond to a set of factored decoders, such as:
(a) API-Get-Status: which generates the name of the GET-Status API frame;
(b) STATUSdeviceID: which generates the deviceID parameter of the GET-Status API frame;
(c) STATUSLocation: which generates the location parameter of the GET-Status API frame;
(d) API-Set-StatusOn: which generates the name of the SET-Status API frame with the isON parameter;
(e) STATUSonID: which generates the deviceID parameter of the SET-Status API frame with the isON parameter;
(f) STATUSon: which generates the isON parameter of the GET-Status API frame with the isON paramter;
(g) API-Set-StatusOnline: which generates the name of the SET-Status API frame with the isONLINE parameter;
(h) STATUSonlineID: which generates the deviceID parameter of the SET-Status API frame with the isON-LINE parameter;
(i) STATUSonline: which generates the isONLINE parameter of the GET-Status API frame with the isON-LINE paramter.

These are not the only way that the set of API frames can be factored. The goal is to factor the decoder into a set of modules that correspond to the various APIs and parameters in the set of target API frames so that the individual concepts of the API frame portions (name, parameters, and so forth) are easily understandable as described in greater detail below.

Thus, the different modules in a factored decoder correspond to the different portions of an API frame, such as the name, parameters, and so forth for each API frame in the set of target API frames. As another example, for a representative GET-Messages API frame that has possible parameters of filter by sender (FILTER (sender)), filter by read or not read (FILTER (isRead)), select if the message has an associated attachment or not (SELECT (attachments)), order by date and time (ORDERBY (receivedDateTime)), and search for messages having keywords (SEARCH (keywords)), the decoder would factor the API frame so there is an API module that recognizes the API, a FILTER module for the sender, a FILTER module for isRead, an ORDERBY module, and a SEARCH module. When parameters are optional, the optional parameters may or may not be activated during decoding. Thus, in general, the decoder is factored into modules that correspond to one or more modules that recognize the APIs in the API frame set and a module for each parameter in each API in the API frame set.

The task of a module, if triggered, is to read the input utterance as encoded by the encoder 504 and instantiate (recognize) a full parameter. To do that, a module needs to determine its parameter values based on the encoded input utterance. For example, given an input utterance "unread emails about PhD study," the SEARCH module needs to predict that the value of the SEARCH parameter is "PhD study," and generate the full parameter "SEARCH PhD study," as an output sequence. Similarly, the FILTER (isRead) module needs to learn that phrases like "unread emails," "emails that have not been read," and "emails not read yet," all indicate its parameter value is FALSE.

Because each module in the decoder has clearly defined semantics, it becomes straightforward to enable user interaction at the module level. Formally, a module Mk is an attentive decoder as defined in equations (7)-(12), with the goal to estimate the conditional probability distributions $p(y|x)$, where y is from a set of API frame symbols.

For any given NL utterance, only a few modules will be triggered. Controller module 506 determines which modules to trigger. Specifically, the controller is also implemented as an attentive decoder. Using the encoded NL utterance as an input, it generates a sequence of modules called a layout. The modules are then activated and generate their respective parameters and finally, the parameters are composed to form the final API frame. Formally, the controller is an attentive decoder as defined in equations (7)-(12) with the goal to estimate the conditional probability distribution $p_c(l|x)$, where the layout l is from the set of modules.

In the representative example of FIG. 5, the controller reads the encoded input utterance and generates the sequence of modules: API 508, FILTER(isRead) 510, and SEARCH 512. Each module is activated and reads the encoded input utterance to generate their respective parameter, where the main work is to determine the correct parameter values based on the utterance. Thus, API 508 generates GET-Messages 514, FILTER(isRead) 510 generates FILTER isRead FALSE 516 and SEARCH 512 generates SEARCH Project Alpha 518.

The API 508, FILTER(isRead) 510, and SEARCH 512 modules can easily be mapped to an explanation that users can easily understand. The API module 508 generates the name of the API that will be called. The FILTER(isRead) module 510 selects messages that are/are not read. The SEARCH module 512 searches for messages having the associated keywords.

For the factored decoder 520, for a particular set of training examples (training data) given by: $\{(x_i, l_i, y_i)\}_{i=1}^{N}$ the loss function $\Theta$ comprises three kinds of losses which together are given by:

$$\Theta = \frac{1}{N}\sum_{i=1}^{N}(\Theta_{c,i} + \Theta_{m,i}) + \lambda\Theta_{L2} \quad (13)$$

For the $i^{th}$ example, the controller loss is a cross-entropy loss on the layout prediction given by:

$$\Theta_{c,i} = -\log p_c(l_i|x_i) \quad (14)$$

Suppose the "gold" layout (ground truth layout) of the $i^{th}$ example $l_i = \{M_1, M_2, \ldots, M_t\}$ with respect to parameters $\{y_{i,1}, y_{i,2}, \ldots, y_{i,t}\}$, the module loss is the average cross-entropy loss on the module predictions:

$$\Theta_{m,i} = -\frac{1}{t}\sum_{j=1}^{t}\log p_j(y_{i,j}|x_i) \quad (15)$$

Finally, an L2 regularization term $\Theta_{L2}$ is added with balance parameter $\lambda$ to alleviate overfitting. Dropout as discussed in the paper "Geoffrey E. Hinton, Nitish Srivastava, Alex Krizhevsky, Ilya Sutskever, and Ruslan R. Salkhutdinov, *Improving Neural Networks by Preventing Co-adaptation of Feature Detectors*, arXiv: 1207.0580 [cs.NE] 2012" can also be applied. As discussed in this paper, dropout is applied by randomly removing hidden units in the neural network as training data points are presented. On each presentation of each training case, each hidden unit is randomly omitted from the network with a probability of 0.5, so a hidden unit cannot rely on other hidden units being present. This prevents co-adaptation between the hidden units and helps alleviate overfitting.

Figure 6:
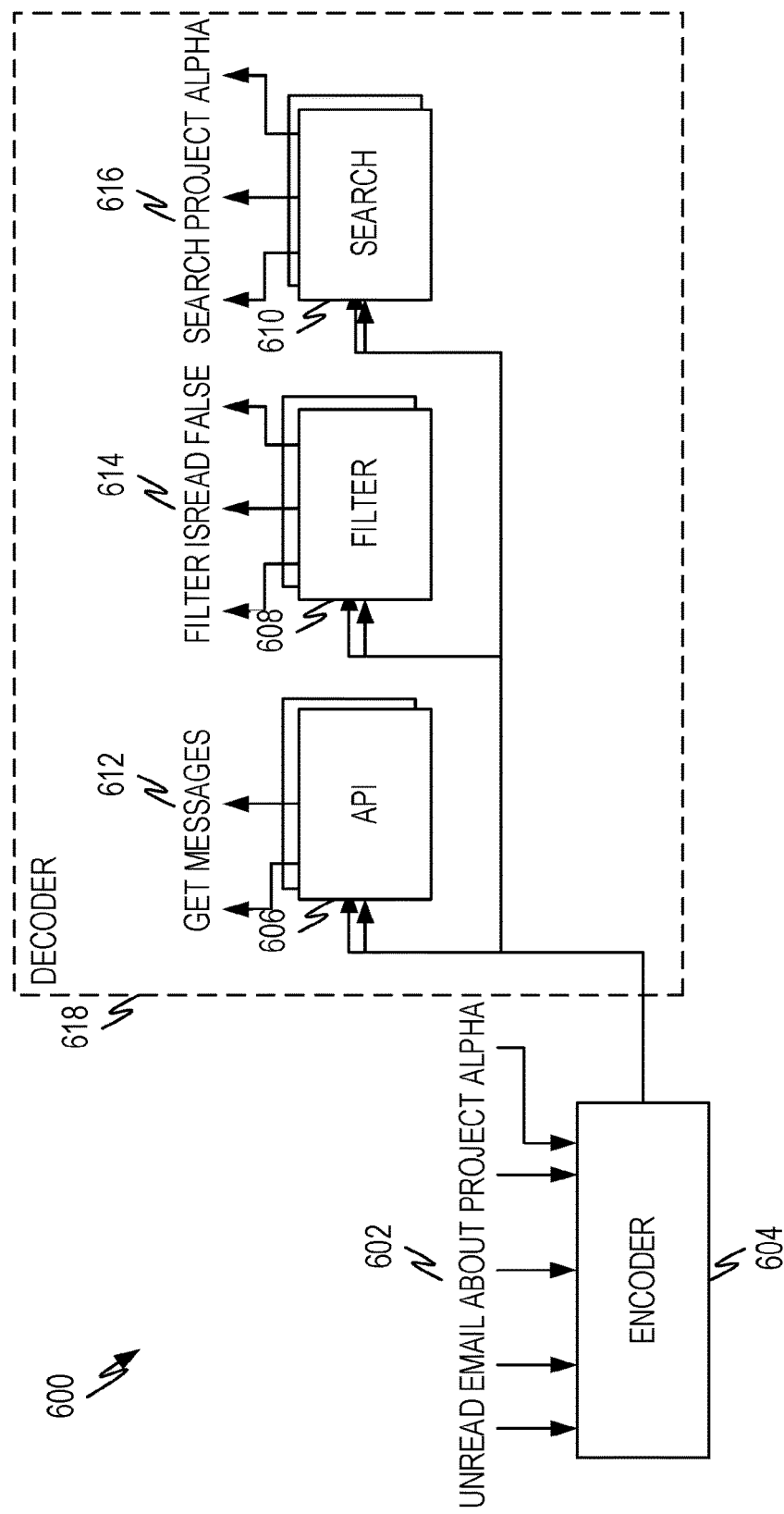
FIG. 6 illustrates a representative flow diagram for conversion of natural language input into an API frame using a machine learning model according to some aspects of the present disclosure.

FIG. 6 illustrates a representative flow diagram 600 for conversion of natural language input into an API frame using a machine learning model according to some aspects of the present disclosure. This flow diagram is very similar to the flow diagram in FIG. 5 and many of the principles and discussion above applies to this diagram. The primary difference in this flow diagram is that the factored decoder 618 does not have a controller.

In the embodiment of FIG. 6, the encoder 604 receives the NL utterance 602 and encodes the utterance in the same fashion as described in FIG. 5 and the same discussion above applies equally in this embodiment.

The decoder 618 is factored with decoder modules as discussed above, where each decoder module represents a property of the API frames in the API frame set that represents the output of the decoder. Each factored decoder module is trained as discussed above. There is, however, no controller module. Because there is no controller module to identify a layout and active the decoder modules in the layout, each individual decoder module self-activates when the proper input sequence is recognized. Thus, the input sequence (output of the encoder) is sent to each decoder module in the entire set. The modules receive the input and, when the proper input sequence is recognized, they self-activate and produce the proper output as described above. Thus, in the example of FIG. 6, which is the same example of FIG. 5, the API module 606 recognizes the name of the API and generates GET-Messages 612, FILTER(isRead) 608 generates FILTER isRead FALSE 614 and SEARCH 610 generates SEARCH Project Alpha 616.

The outputs of the activated modules are aggregated to a final output API frame. Additionally, the decoder modules can be mapped to the interactive UI as discussed herein.

Figure 7:
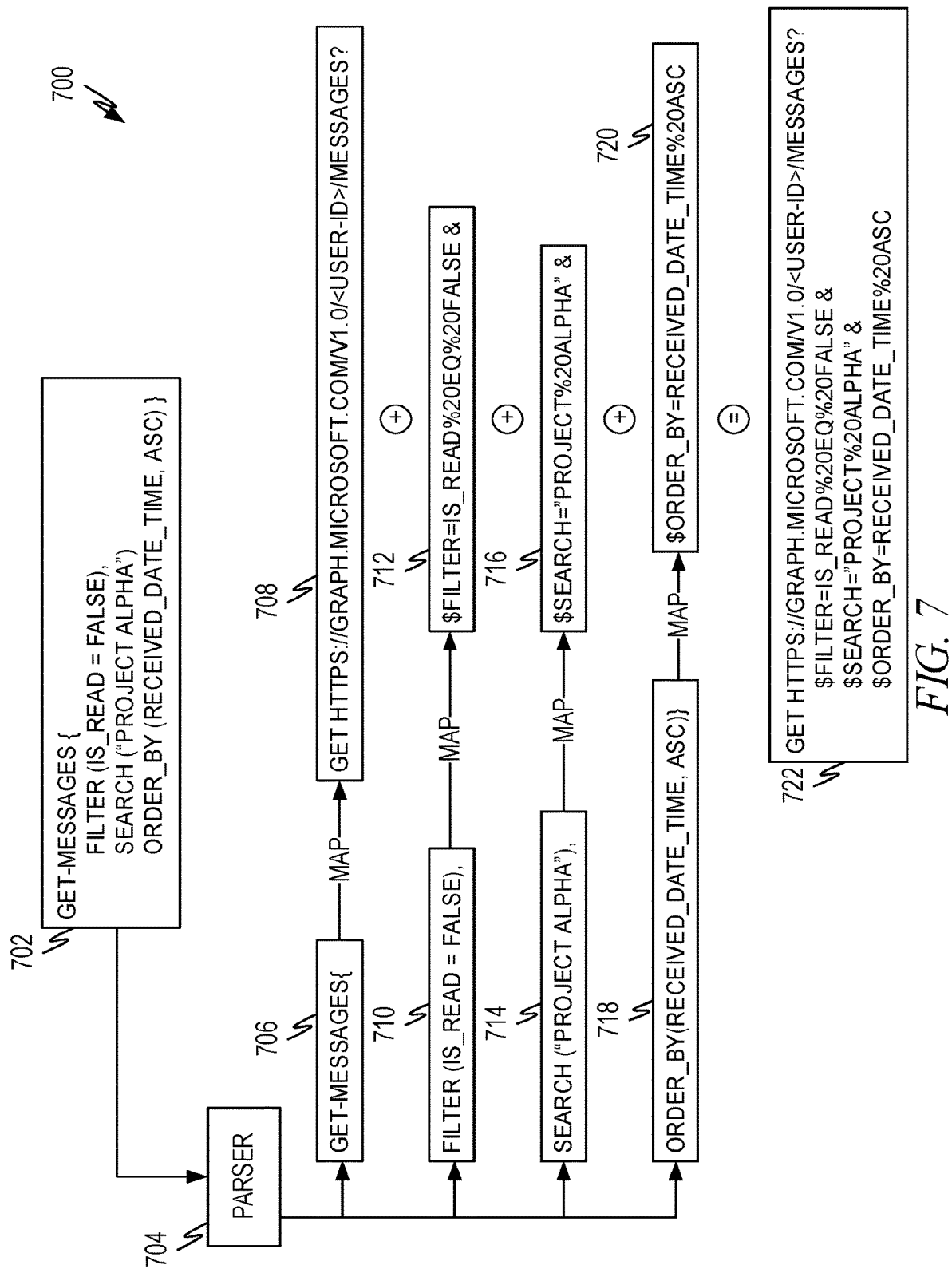
FIG. 7 illustrates a representative flow diagram for mapping an API frame to an API call.

Once the API frame is generated by the machine learning model, as described above, the API frame is mapped to an API call. FIG. 7 illustrates a representative flow diagram 700 for mapping an API frame to an API call. The mapping is accomplished by deterministic rules which map parts of the API frame to corresponding parts in the API call. In the embodiment of FIG. 7, a parser is used to parse out the various parts of the API frame and then rules are used to map the parsed parts to portions of the API call. These portions are then assembled to yield the API call.

As a representative example, FIG. 7 shows the mapping of the API frame:

---
GET-Messages {
    Filter (isRead = FALSE),
    Search ("Project Alpha"),
    OrderBy (receivedDateTime, asc) }
--- to the API call of:

---
GET https://service.domain.com/v1.0/<user-id>/messages?$filter=isRead%20eq%20FALSE&$search="Project%20Alpha"&$orderby=receivedDateTime%20asc
---

Parser 704 is adapted to parse the API frames into their constituent parts. Thus, for the input API frame 702, the first part is the name of the API 406. This is parsed as "GET-Messages" 706. The '{' character indicates the end of the name has been reached and that parameters will arrive next.

A set of deterministic rules map the different names of the API frames to the names of the API call. Thus, the API name 706 is mapped to the API call name 708 along with formatting and other information needed to turn the API frame into a callable API. Thus, in the representative example, the API frame name "GET-Messages" 708 is mapped to the API call name "GET https://service.domain.com/v1.0/<user-id>/messages?" 710. In order to complete the mapping, the set of deterministic rules can utilize additional information. For example, in the above API call, the parameter <user-id> is not in the API frame and can be drawn from a user profile or other source. These additional data sources can provide additional information that is not in the API frame and is not part of the mapping rules.

The next part of the parsed API frame is a filter parameter type. This is specified in the API frame as "Filter (isRead=FALSE)" 710. This is mapped to the corresponding mechanism in the API call for the parameter. In the representative example, this is the $filter parameter "$filter=isRead%20eq%20FALSE" 712. The joining '&' character can be placed into the output when the parser determines that additional parameters are still to come.

The next part of the parsed API frame is a search parameter type. This is specified by "Search ("Project Alpha")" 714. This is mapped by a deterministic rule to the API call for the corresponding parameter, $search. Thus, the search parameter type is mapped to "$search="Project%20Alpha"" 716. Again, the '&' character can be placed into the output stream once the parser recognizes additional parameter types exist.

The last parameter type is "OrderBy (receivedDateTime, asc)" 718 which is mapped to the corresponding API call parameter type of "$orderby=receivedDateTime%20asc" 720. The '}' character indicates to the parser that the end of the API frame has been found and the parser can then assemble the various parts of the API call output stream into the corresponding API call 722.

In the above example, each part of the parsed API frame had a corresponding part in the API call. In some situations, the API call may need an explicit parameter that is not specified in the API frame. For example, the API frame may identify a parameter as optionally specified and assume a default value for parameters that are not explicit for the optional parameters. However, the actual API call requires a value for all the optional parameters. In this situation, the rules can add the required parameters along with the default values to ensure the API call is complete and complies with the necessary calling convention, formatting, parameter requirements and so forth.

The same can be true where the API frame has a parameter and that same parameter is optional with a default value in the API call. In this situation, the parameter can be left out of the API call if the value of the parameter in the API frame matches the default value in the API call.

Figure 8:
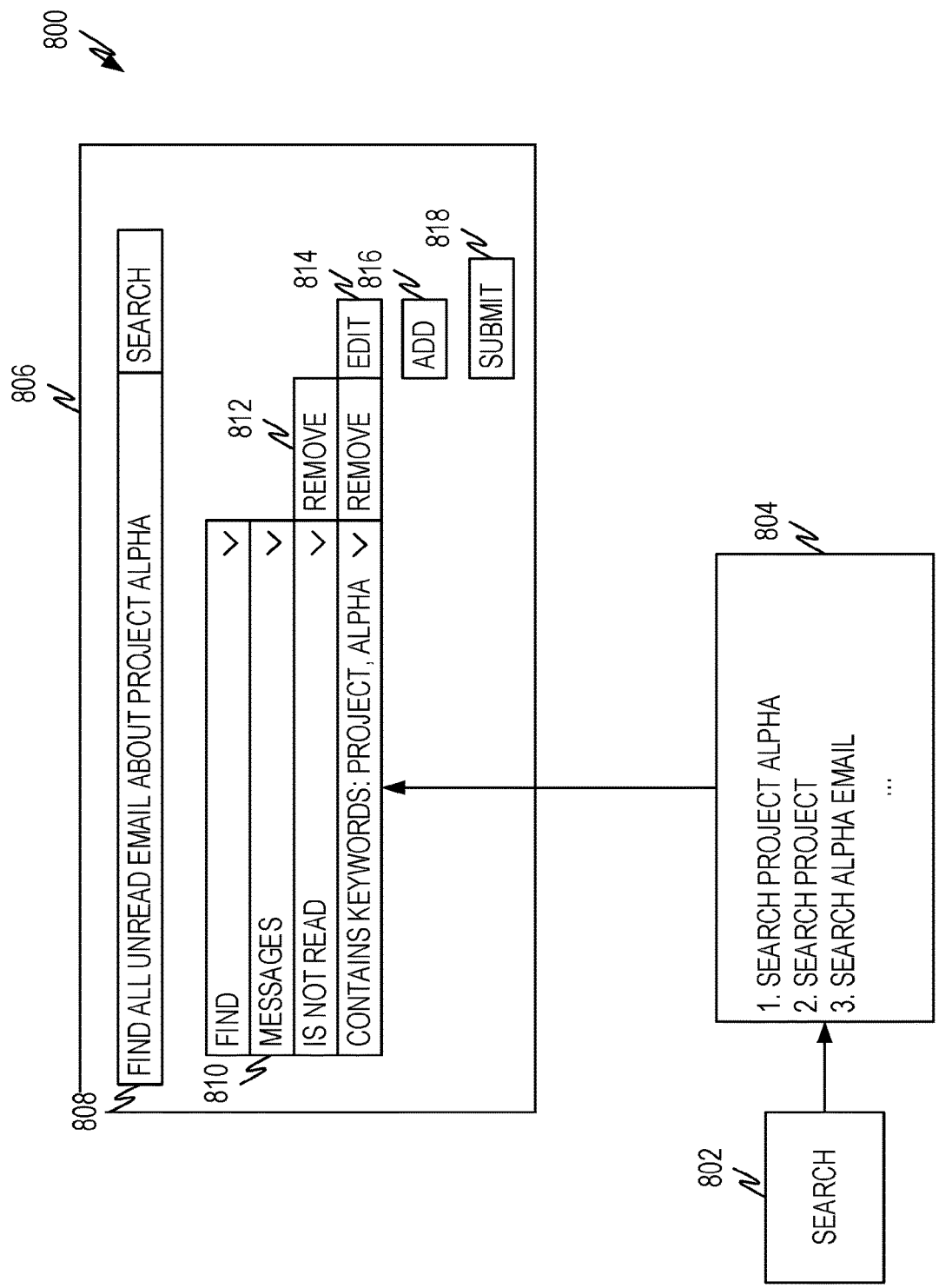
FIG. 8 illustrates a representative diagram showing an interactive user interface for conversion of natural language input into an API call using a machine learning model according to some aspects of the present disclosure.

FIG. 8 illustrates a representative diagram 800 showing an interactive user interface 806 for conversion of natural language input into an API call using a machine learning model according to some aspects of the present disclosure. With a factored decoder, the individual decoder modules can be mapped to easily understandable concepts for presentation on an interactive user interface 806. For example, using the example of the Get-Messages API frame:

```
GET-Messages {
    Filter (isRead = FALSE),
    Search ("Project Alpha"),
    OrderBy (receivedDateTime, asc) }
``` the individual models that would have produced the API frame are the API module, which generates the name (Get-Messages), the FILTER(isRead) module which generates the filter that pulls read/not read emails (isRead=FALSE), the SEARCH module which generates the search string ("Project Alpha"), and the ORDERBY module which generates the parameter that orders the received emails in ascending received date/time. The output generated by each of these modules is mapped to a description that is easily understandable to the user.

The interactive user interface 806 can comprise an entry filed 808 or other mechanism, such as a button to activate the microphone to receive spoken utterances, for the user to enter the NL utterance. Once the utterance is complete, the user can indicate completion such as by pressing a control (e.g., the "search" control), by waiting for a period of time, or any other indication that the utterance is complete.

The utterance is sent to the conversion process as discussed above, and each of the individual decoder modules produce their output. The interactive portion of the UI 810 is assembled based on which modules are activated (e.g., by the layout or by self-activation). Because each module has a corresponding explanation for the user, the individual fields and controls of the interactive portion of the UI 810 can be assembled once it is known which modules were triggered, along with their associated output. Thus, the interactive portion of the UI 810 represents in a very direct way the factored output of the factored decoder and can change from invocation to invocation so that that what is displayed is easily understood as what was produced by the machine learning model.

In the Get-Messages API frame above, there are several representative mappings that are displayed in interactive UI 810. The Get-Messages name, is broken down into two fields. "Get" is easily explained to the user as "FIND" as shown in the figure. The "Messages" portion can be explained to the user as "Messages" or "email" or a descriptor that will allow the user to quickly see the correlation between what was input as the NL utterance and how the machine learning model recognized that aspect of the NL utterance.

The FILTER(isRead) output along with the generated parameter "FALSE" is easily explained by the "is not read" aspect of the interactive UI 810. Similarly, the SEARCH module output of SEARCH ("Project Alpha") is easily explained as "contains keywords: Project, Alpha" as illustrated.

The interactive UI 810 can contain controls that allows the user to adjust what the generated output should be in order to bring the generated output of the machine learning model into alignment with what the user wanted when they entered the NL utterance. Because of the fine-grained control of the interactive UI 810, the user can correct the generated output on a fine-grained basis.

The controls can comprise, for example, a control to remove a module that was activated 812. Thus, if there is an error in the layout or self-activation and a module was activated that should not have been, the user can remove the module using the remove control 812.

The controls can also comprise a control to add a module that should have been activated but was not. Thus, if the layout or self-activation missed a module that should have generated output, the output that should have been generated by the missed module can be added via add control 816.

In addition to addition and/or removal, the output of the modules can be edited if they should have been activated and were activated, but produced incorrect output. This is shown, for example, by the edit control 814.

Additionally, or alternatively, some modules may be trained to generate multiple output parameters. As a representative example, the SEARCH module 802 may have several candidates that are likely from the input NL utterance. For example, the NL utterance input into 808 may cause the SEARCH module 802 to generate "search project alpha," "search project," and "search alpha email" as likely options for the output parameters. The output options may have an associated ranking or score also generated by the module. These options 804 can be presented in the interactive UI 810 such as in a dropdown box so that the most likely option is displayed. If the user is not satisfied with the displayed option, the user can click the dropdown control (down arrow in the interactive UI associated with each filed) and select another option. For parameters that have a limited number of fixed options such as boolean parameters that can be TRUE or FALSE, the set of fixed options can be displayed in the dropdown box so that the use can pick a different value of the generated option is not what the user wanted.

Once the user makes any desired changes, the user can indicate they are satisfied with the API frame using a submit control 818 or other indicator that they have no (further) changes to be made.

Because of the fine-grained mapping from the decoder modules to the interactive UI, the API frame can be easily updated and then the API frame can be mapped to the API call as previously discussed.

Although the interactive UI 810 is illustrated as being presented in a textual format, other formats can be used such as sound (speech), or combinations of formats such as a combination of speech and text.

Tests were performed with the factored decoders and it was shown that the interactive UI greatly improves the prediction accuracy using only a small amount of interaction. With only one round of interaction, the testing accuracy improved from about 0.5 to over 0.9. Furthermore, in a comparative study performed by users, the interactive UI was compared to a non-interactive counterpart, where a "black box" decoder produced output that was not factored to the interactive UI such as described above which presented factored output and allowed users to make changes. In the black box decoder, if the output was wrong the user had no option but to reformulate the NL utterance and try again. In the factored output, if it was wrong the interactive UI allowed the user to make adjustments and submit the adjusted query. The test data showed that the interactive UI lead to higher task rate success, shorter task completion time (less user effort), and remarkably higher user satisfaction rates. The majority of the participants indicate they prefer the interactive UI illustrated above as opposed to reformulating the NL utterance and trying again.

In the tests, a factored decoder was trained using the publicly available dataset NL2API released in "Yu Su, Ahmed Hassan Awadallah, Madian Khabasa, Patrick Pantel, Michael Gamon, and Mark Encarnacion, *Building Natural Language Interfaces to Web APIs*, Proceedings of the International Conference on Information and Knowledge Management, 2017." In training the model, the data was split into a training set and a testing set. Additionally, 20% of the data was withheld to use as a validation set.

In a first test in which a NL utterance was input and the output of the model compared to what should have been output, it was discovered that with a single adjustment (e.g., adding a module via the UI, removing a module via the UI, adjusting a parameter via the UI) that the accuracy increased from around 0.5 to over 0.9 additional interactions further increased the accuracy. Furthermore, in human interactions with a non-interactive, non-factored decoder and the interactive UI associated with the factored decoder, users overwhelmingly favored the interactive UI and factored decoder. 60% of the uses were satisfied or strongly satisfied with the interactive mode compared to only 35% reporting they were satisfied or strongly satisfied with the non-interactive non-interactive mode. The perceived extra effort was dramatically better for the interactive mode compared to the non-interactive mode. Only 25% of participants using the non-interactive mode reported that they needed little extra effort to complete the tasks compared to 70% of participants using the interactive mode reporting that they needed little extra effort to complete the tasks. Furthermore, the number of actions taken to achieve the correct API frame and the time to achieve the correct frame were much smaller for the interactive UI. Table 2 below presents the results. In the table an unsuccessful attempt was where a user abandoned the task prior to completion and moved onto another task.

TABLE 2

Actions and time to completion or abandonment

| UI | Successful | #Actions | Time to completion or abandonment |
| --- | --- | --- | --- |
| Non-interactive | NO | 6.39 | 119.08 |
| Non-interactive | YES | 4.67 | 84.08 |
| Non-interactive | All | 5.10 | 92.83 |
| Interactive | NO | 4.30 | 47.40 |
| Interactive | YES | 3.45 | 29.81 |
| Interactive | All | 3.73 | 35.54 |

Gathering training data to train the machine learning model in the NL utterance to API conversation process can be somewhat labor intensive. As described below the training of the sequence to sequence neural model uses a supervised training process. Supervised training uses annotated data, which corresponds to the input data and the corresponding desired output. For the embodiments that have a controller, the annotated data also includes the proper layout. Collecting such annotated data can, for example, utilize a set of annotators and/or crowd sourced workers. They would take a variety of NL utterances and, having knowledge of the set of API frames, identify which API frame the NL utterance corresponds to along with the parameters, values for those parameters, and, for embodiments with a controller, the proper layout. However, given the wide variety of NL utterances that can map to the same API frame and the same parameters and values, ensuring sufficient coverage so that a wide variety of different NL utterances are covered can be somewhat difficult. Such can be relatively labor intensive and difficult. The interactive UI and the fine-grained control provides an excellent mechanism to gather ongoing training data to allow for either a cold start type deployment scenario or further adjustment after deploying an initially trained machine learning model.

Figure 9:
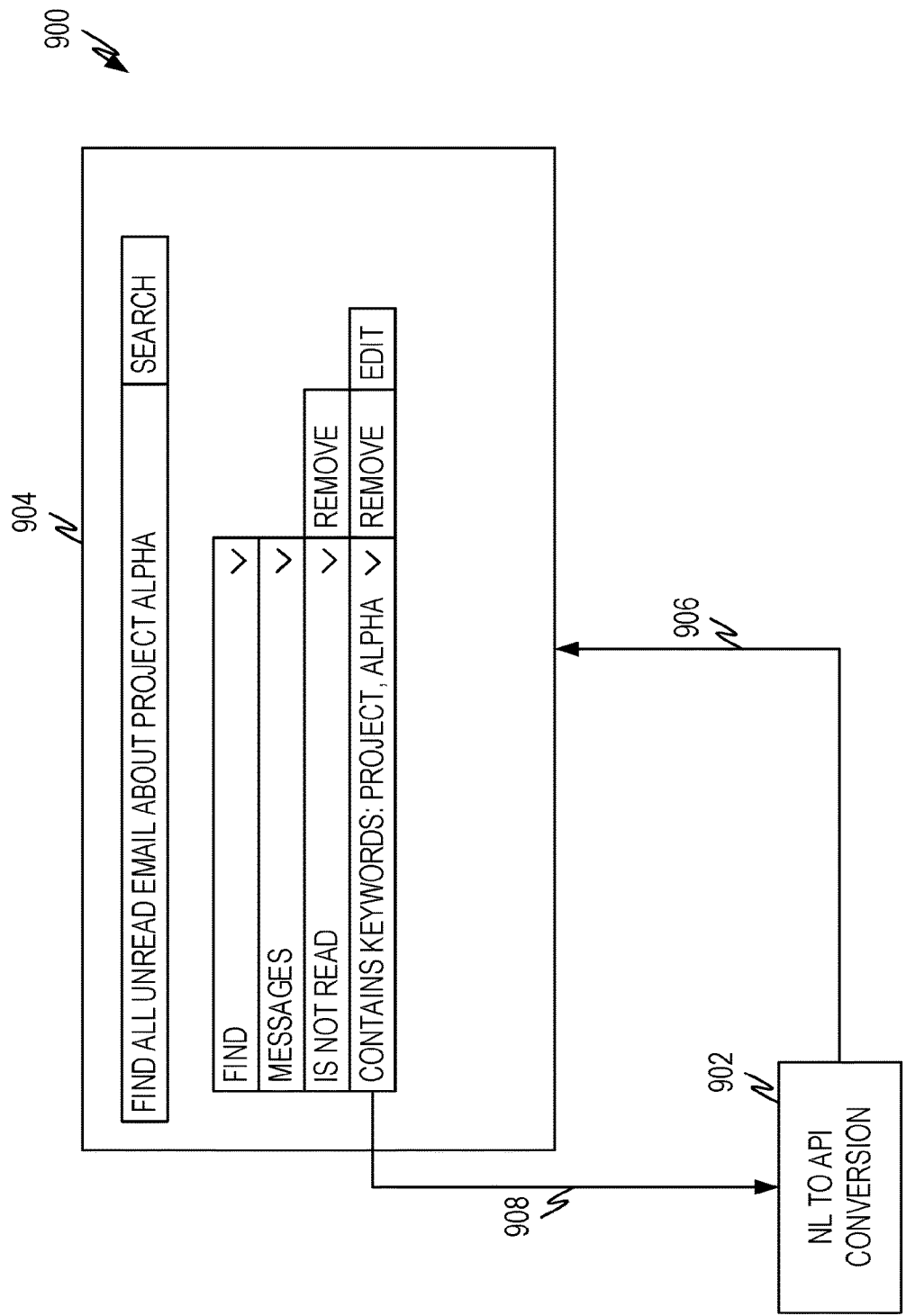
FIG. 9 illustrates feedback from a representative interactive user interface for conversion of natural language input into an API call using a machine learning model according to some aspects of the present disclosure.

FIG. 9 illustrates 900 feedback 908 from a representative interactive user interface 904 for conversion of natural language input into an API call using a machine learning model according to some aspects of the present disclosure. This high-level diagram shows how additional training data can be gathered.

As noted above, the interactive user interface 904 comprises different fields, values and so forth that correspond directly to the output of the activated decoder modules in the factored decoder, such as decoder 520 and 618. Because of the fine-grained control and feedback that a user has and the direct correspondence to individual decoder modules, once the user has made any corrections and submitted the finalized information for the API frame 908, the submitted data can be used as an additional training data point. Effectively, the user becomes the annotator for the submitted NL utterance showing how the machine learning model should have generated the API frame. Additionally, because the submitted corrections correspond directly to the output of the various decoder modules, the submitted data 908 show the correct layout and the output that should have been produced by each of the activated decoder modules.

This submitted information 908 can be aggregated by the NL to API conversion process 902 and/or another system and/or process so that the machine learning model can be updated to reduce errors in future conversions 906.

Figure 10:
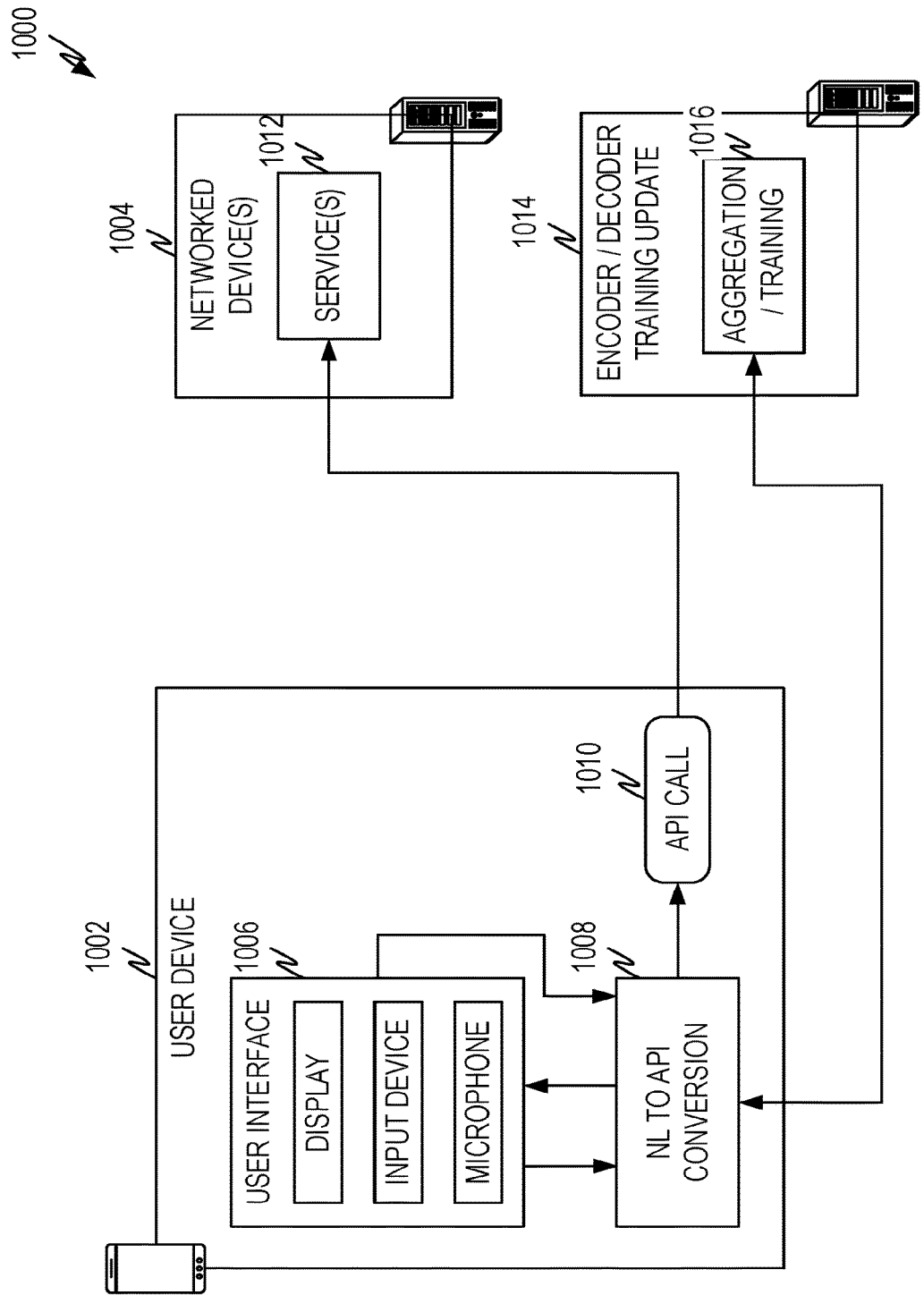
FIG. 10 illustrates a representative system architecture with machine learning model training according to some aspects of the present disclosure.

FIG. 10 illustrates a representative system architecture 1000 with machine learning model training according to some aspects of the present disclosure. This architecture 1000 shows a representative embodiment of how interactive UI can be used to gather training data for API conversion.

As discussed, the NL utterance is received by the user interface 1006 of the user device 1002. The NL utterance is passed to the NL to API conversion process 1008. Once the NL utterance is decoded into an API frame as discussed above. The output of the factored decoder modules are presented to the user in an interactive UI via the user interface 1006. As previously described, the user makes any adjustments and submits the adjusted API frame to the NL to API conversion process 1008.

The adjusted API frame is mapped using a deterministic process and/or rules as previously described to produce the API call 1010.

Once the adjusted API frame has been submitted the NL to API conversion process 1008 has an annotated data point that includes the input NL utterance, a correctly decoded API frame along with the correct output for each decoder module, and/or the correct layout. This data point can be saved and aggregated locally and sent to an encoder/decoder training update machine 1014 until a triggering event or passed to the encoder/decoder training update machine 1014 as they are collected. The triggering even can be one or more of: passage of time such as a periodic or aperiodic schedule, number of data points collected, amount of local storage used, projected bandwidth to send the collected data points, type of data connection between the user device 1002 and the encoder/decoder training update machine 1014, and so forth.

The data received on the encoder/decoder training update machine 1014 can be aggregated by a training/update process 1016 and, upon a triggering event, the aggregated data can be used to update the machine learning model, the parameters associated with the machine learning model, or both. The data can be aggregated based on user cohorts or aggregated across all users. A user cohort is a group of users that have one or more aspects in common such as commonality among one or more parameter of a user profile, geographic proximity, demographic similarity, and/or any other type of similarities. The triggering event can be one or more of: passage of time such as a periodic or aperiodic schedule, number of data points collected, amount of storage used, and so forth.

The training/update process 1016 distributes updated parameters, updated models or both to the appropriate users. The appropriate users are those users for whom the model was trained/updated. The NL to API conversion process 1008 utilizes the updated parameters and/or updated models for conversion from the NL utterance to the API frame once they are received.

Figure 11:
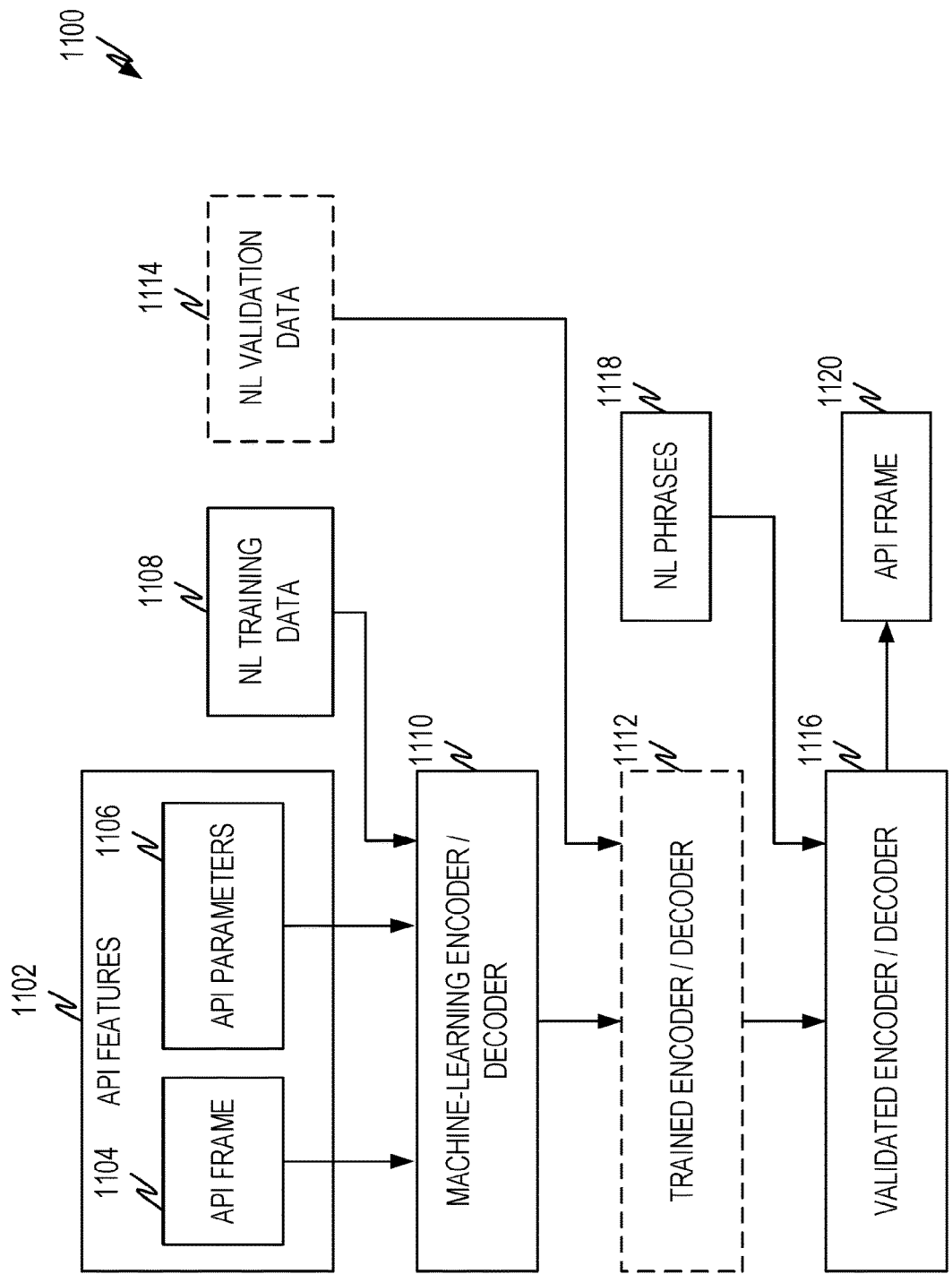
FIG. 11 illustrates a representative training process for a machine learning model according to some aspects of the present disclosure.

FIG. 11 illustrates 1100 a representative training process for a machine learning model according to some aspects of the present disclosure. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model 1112 from example training data 1108 in order to make data-driven predictions or decisions expressed as outputs or assessments like the API frame 1120. Although example embodiments are presented as using a sequence to sequence neural model, other embodiments may utilize different machine learning models.

In some example embodiments, different machine-learning tools may be used. For example, Logistic Regression (LR), Naive-Bayes, Random Forest (RF), neural networks (NN), matrix factorization, and Support Vector Machines (SVM) tools may be used for producing an API frame.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide the mapping from NL utterance to API frame. The machine-learning algorithms utilize the training data 1108 to find correlations among identified features 1102 that affect the mapping from NL utterance to API frame.

In one example, the features 1102 may be of different types and may include an API name 1104, API parameter(s), and other features as described herein.

With the training data 1108 and the identified features 1102, the machine-learning model 1112 is trained at operation 1110. The machine-learning model appraises the value of the features 1102 as they correlate to the training data 1108. The result of the training is the trained machine-learning model 1112.

After the trained machine-learning model 1112 is produced, a validation operation may be performed in some instances. Validation involves taking a set of annotated data 1114 and using the trained machine learning model 1112 to produce an output for each of the data points in the validation data set 1114. The output for the set is compared to the annotations which describe what should have been output from the machine learning model 1112. Statistics can be evaluated to see how well the trained machine learning model 1112 operates and, if the accuracy is acceptable, the trained machine learning model 1112 can be validated 1116. Otherwise, additional training can be performed.

When the machine-learning model 1112 or 1116 is used to perform an assessment, new data 1118 is provided as an input to the trained machine-learning model 1116, and the machine-learning model 1116 generates the assessment such as API frame 1120 as output.

For embodiments of the present disclosure, a supervised learning process is used. Initial training can be done using available data, such as the NL2API data set previously described. As additional data is collected such as through the interactive UI discussed herein, the additional annotated data can be used for further training. The advantage of this is that as user's input NL utterances shift, such as through vocabular shifting and so forth, the machine learning model can be updated to account for these changes.

Additionally, as new APIs are added to the set of APIs, or existing APIs are changed, new machine learning models can be distributed having new and/or updated factored decoder modules. Furthermore, because annotated data is produced via the interactive UI, new decoder modules (e.g., to handle new or updated APIs) can be deployed in a cold start fashion without training and/or with little training and as additional data is gathered, the decoder modules training updated.

Example Machine Architecture and Machine-Readable Medium

Figure 12:
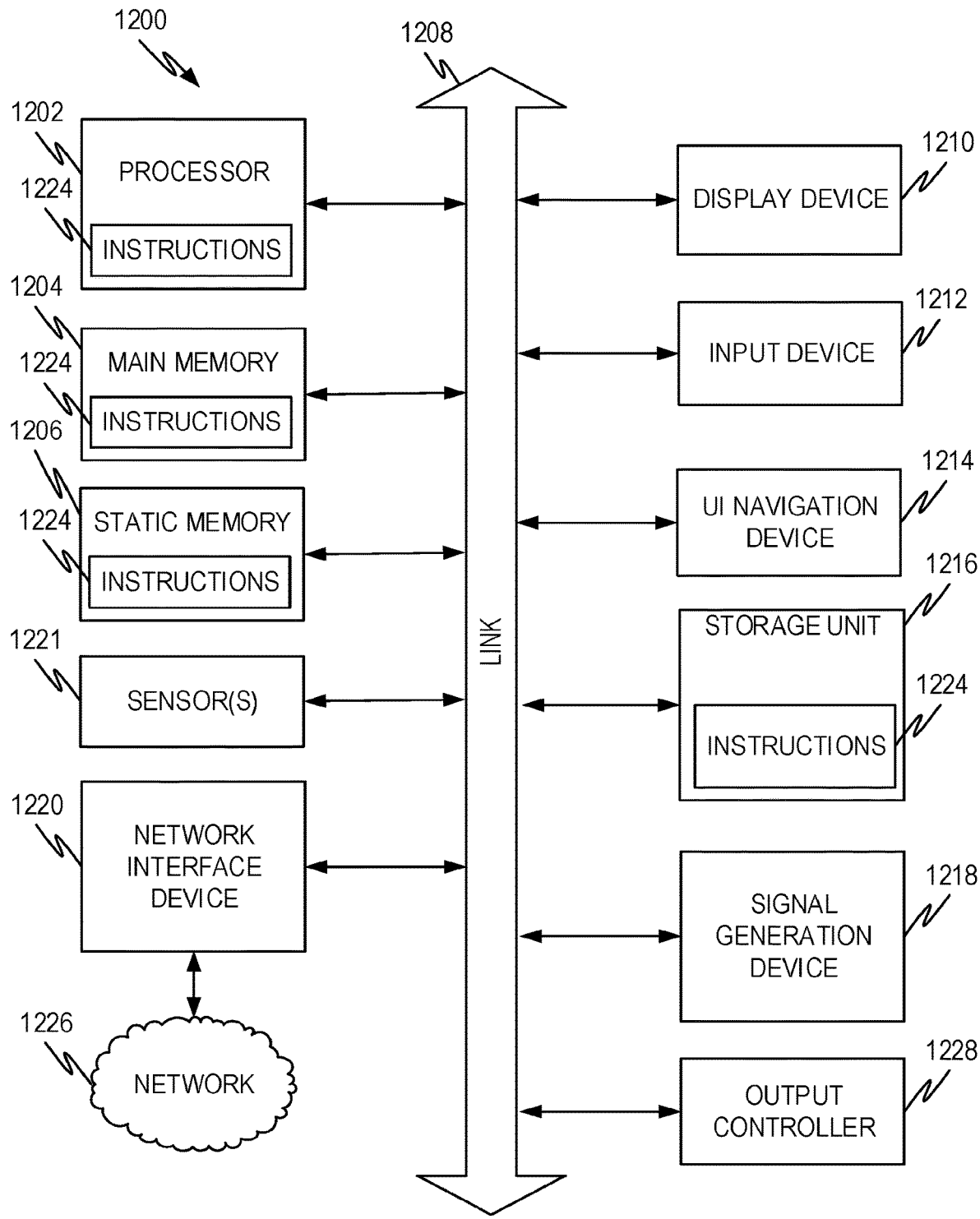
FIG. 12 illustrates a representative machine architecture suitable for implementing the systems and other aspects disclosed herein or for executing the methods disclosed herein.

FIG. 12 illustrates a representative machine architecture suitable for implementing the systems and other aspects disclosed herein or for executing the methods disclosed herein. The machine of FIG. 12 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 12 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1200 includes at least one processor 1202 (e.g., a central processing unit (CPU), a graphics processing unit (GPU), advanced processing unit (APU), or combinations thereof), one or more memories such as a main memory 1204, a static memory 1206, or other types of memory, which communicate with each other via link 1208. Link 1208 may be a bus or other type of connection channel. The machine 1200 may include further optional aspects such as a graphics display unit 1210 comprising any type of display. The machine 1200 may also include other optional aspects such as an alphanumeric input device 1212 (e.g., a keyboard, touch screen, and so forth), a user interface (UI) navigation device 1214 (e.g., a mouse, trackball, touch device, and so forth), a storage unit 1216 (e.g., disk drive or other storage device(s)), a signal generation device 1218 (e.g., a speaker), sensor(s) 1221 (e.g., global positioning sensor, accelerometer(s), microphone(s), camera(s), an eye tracking subsystem, and so forth), output controller 1228 (e.g., wired or wireless connection to connect and/or communicate with one or more other devices such as a universal serial bus (USB), near field communication (NFC), infrared (IR), serial/parallel bus, etc.), and a network interface device 1220 (e.g., wired and/or wireless) to connect to and/or communicate over one or more networks 1226.

Rather than the more conventional microprocessor, Neural Network chips can be used to implement embodiments of the present disclosure. Neural Network chips are specialized chips designed to execute various forms of neural networks and can be used in the sequence to sequence neural models or other machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 1204, 1206, and/or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A computer implemented method, comprising:
  receiving a natural language utterance;
  submitting the natural language utterance to a trained machine learning model comprising a sequence to sequence neural model, the sequence to sequence neural model comprising an encoder and a plurality of decoders, each of the plurality of decoders coupled to the encoder and being trained to recognize one or more tokens output from the encoder and to map the one or more tokens to one or more items of an API frame;
  receiving from the trained machine learning model, a plurality of items, each item received from a different decoder;
  assembling the plurality of items into the API frame, the API frame representing an intermediate format between the natural language utterance and a final API format;

mapping the API frame to the final API format; and
issuing a call to the API using the final API format.

Example 2. The method of example 1 wherein the encoder comprises a recurrent neural network.

Example 3. The method of example 1 wherein each decoder comprises an attentive recurrent neural network.

Example 4. The method of example 1 further comprising a controller coupled the encoder, the controller receiving the output of the encoder and producing a layout comprising the plurality of decoders and activating each of the decoders in the layout.

Example 5. The method of example 1 further comprising:
presenting each item via a user interface, the user interface comprising:
a region to present each item along with an associated indication that indicates what the item means;
a control, which when activated, removes an associated item;
a control, which when activated, adds a new item;
receiving input via the user interface, indicating any changes to the items are complete.

Example 6. The method of example 5 further comprising:
aggregating performance data comprising:
the natural language utterance;
the assembled API frame; and
any changes made to items via the user interface.

Example 7. The method of example 1 wherein mapping the API frame to the final API format is accomplished using a plurality of rules that deterministically maps items of the API frame to items in the final API format.

Example 8. The method of example 1 wherein the encoder and plurality of decoders are trained using a supervised learning process that utilizes annotated natural language utterance data comprising:
a plurality of training natural language utterances; and
an API frame for each of the training natural language utterances.

Example 9. The method of example 1 further comprising updating the training of the sequence to sequence neural model using data gathered using an interactive user interface that presents items output from the plurality of decoders and allows:
an item to be removed prior to assembling items into the API frame;
an item to be added prior to assembling items into the API frame; and
an item to be modified prior to assembling items into the API frame.

Example 10. A system comprising:
a processor and device-storage media having executable instructions which, when executed by the processor, cause the system to perform operations comprising:
receiving a natural language utterance;
submitting the natural language utterance to a trained machine learning model comprising a sequence to sequence neural model, the sequence to sequence neural model comprising an encoder and a plurality of decoders, each of the plurality of decoders coupled to the encoder and being trained to recognize one or more tokens output from the encoder and to map the one or more tokens to one or more items of an API frame;
receiving from the trained machine learning model, a plurality of items, each item received from a different decoder;
assembling the plurality of items into the API frame, the API frame representing an intermediate format between the natural language utterance and a final API format;
mapping the API frame to the final API format; and
issuing a call to the API using the final API format.

Example 11. The system of example 10 wherein the encoder comprises a recurrent neural network.

Example 12. The system of example 10 wherein each decoder comprises an attentive recurrent neural network.

Example 13. The system of example 10 further comprising a controller coupled the encoder, the controller:
receiving the output of the encoder;
producing a layout comprising the plurality of decoders; and
activating each of the decoders in the layout.

Example 14. The system of example 10 further comprising:
presenting each item via a user interface, the user interface comprising:
a region to present each item along with an associated indication that indicates what the item means;
a control, which when activated, removes an associated item;
a control, which when activated, adds a new item;
receiving input via the user interface, indicating any changes to the items are complete.

Example 15. The system of example 14 further comprising:
aggregating performance data comprising:
the natural language utterance;
the assembled API frame; and
any changes made to items via the user interface; and
sending the aggregated data to a system to be used to update training of the sequence to sequence neural model.

Example 16. A computer implemented method, comprising:
receiving a natural language utterance;
submitting the natural language utterance to a trained machine learning model comprising a sequence to sequence neural model, the sequence to sequence neural model comprising an encoder and a plurality of decoders, each of the plurality of decoders coupled to the encoder and being trained to recognize one or more tokens output from the encoder and produce in response an item of an API frame;
receiving from the trained machine learning model, a plurality of items, each item received from a different decoder;
assembling the plurality of items into the API frame, the API frame representing an intermediate format between the natural language utterance and a final API format;
mapping the API frame to the final API format; and
issuing a call to an API using the final API format.

Example 17. The method of example 16 wherein the encoder comprises a recurrent neural network.

Example 18. The method of example 16 or 17 wherein each decoder comprises an attentive recurrent neural network.

Example 19. The method of example 16, 17, or 18 further comprising a controller coupled the encoder, the controller receiving the output of the encoder and producing a layout comprising the plurality of decoders and activating each of the decoders in the layout.

Example 20. The method of example 16, 17, 18, or 19 further comprising:
  presenting each item via a user interface, the user interface comprising:
    a region to present each item along with an associated indication that indicates what the item means;
    a control, which when activated, removes an associated item;
    a control, which when activated, adds a new item;
  receiving input via the user interface indicating any changes to the items are complete.

Example 21. The method of example 20 further comprising:
  aggregating performance data comprising:
    the natural language utterance;
    the assembled API frame; and
    any changes made to items via the user interface.

Example 22. The method of example 16, 17, 18, 19, 20, or 21 wherein mapping the API frame to the final API format is accomplished using a plurality of rules that deterministically maps items of the API frame to items in the final API format.

Example 23. The method of example 22 further comprising drawing information from an additional data source that is not the API frame and placing the information into the final API format.

Example 24. The method of example 22 further comprising using a parser to map the API frame to the final API format.

Example 25. The method of example 16, 17, 18, 19, 20, 21, 22, 23, or 24 wherein the encoder and plurality of decoders are trained using a supervised learning process that utilizes annotated natural language utterance data comprising:
  a plurality of training natural language utterances; and
  an API frame for each of the training natural language utterances.

Example 26. The method of example 16, 17, 18, 19, 20, 21, 22, 23, 24, or 25 further comprising updating the training of the sequence to sequence neural model using data gathered using an interactive user interface that presents items output from the plurality of decoders and allows:
  an item to be removed prior to assembling items into the API frame;
  an item to be added prior to assembling items into the API frame; and
  an item to be modified prior to assembling items into the API frame.

Example 27. The method of example 16, 17, 18, 19, 20, 21, 22, 23, 24, 25, or 26 further comprising:
  receiving an updated sequence to sequence neural model, updated parameters associated with the sequence to sequence neural model, or both; and
  updating the sequence to sequence neural model with the updated sequence to sequence neural model, the updated parameters, or both.

Example 28. The method of example 16, 17, 18, 19, 20, 21, 22, 23, 24, 25, 26, or 27 further comprising:
  mapping each decoder in a subset of the decoders to a corresponding region in a user interface;
  presenting the item produced by each decoder in the subset to the corresponding region; and
  presenting controls associated with each corresponding region which, when activated by a user, allow the user to modify the item produced by the corresponding decoder.

Example 29. An apparatus comprising means to perform a method as in any preceding example.

Example 30. Machine-readable storage including machine-readable instructions, when executed, to implement a method or realize an apparatus as in any preceding example.

Conclusion

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method, comprising:
  receiving a natural language utterance;
  submitting the natural language utterance to a trained machine learning model comprising an encoder and a plurality of decoder modules, each of the plurality of decoder modules coupled to the encoder and being trained to recognize one or more tokens output from the encoder and to map the one or more tokens to one or more corresponding application programming interface (API) parameters;
  receiving, from the trained machine learning model, a plurality of API parameters provided by two or more decoder modules of the plurality of decoder modules, the two or more decoder modules being selectively activated on an individual basis based at least on the one or more tokens output from the encoder;
  mapping the plurality of API parameters into an API call; and
  outputting the API call.

2. The method of claim 1, wherein the two or more decoder modules include a first decoder module configured to output a first API parameter of the API call and a second decoder module configured to output a second API parameter of the API call.

3. The method of claim 1, wherein the trained machine learning model comprises a controller configured to selectively activate individual decoder modules based at least on an encoded utterance output by the encoder.

4. The method of claim 1, wherein individual decoder modules are configured to receive an encoded utterance output by the encoder and selectively self-activate based at least on the encoded utterance.

5. The method of claim 1, further comprising:
  using a set of deterministic rules to map the plurality of API parameters into the API call.

6. The method of claim 1, further comprising:
  outputting a first API parameter provided by a first decoder module;
  receiving user input indicating whether the first API parameter is correct; and
  training the first decoder module based at least on the user input.

7. The method of claim 6, wherein the outputting the first API parameter comprises displaying a graphical user interface having an edit control configured to edit the first API parameter to a corrected first API parameter in response to the user input.

8. The method of claim 7, further comprising including the corrected first API parameter in the API call and outputting the API call to a service.

9. A system comprising:

a processor; and a device-storage media storing executable instructions which, when executed by the processor, cause the processor to:

process a natural language utterance using an encoder to obtain an encoded utterance;

selectively activate individual decoders of a plurality of decoders based at least on the encoded utterance;

using the activated individual decoders, map tokens of the encoded utterance into corresponding application programming interface (API) parameters; and generate an API call having the corresponding API parameters.

10. The system of claim 9, wherein the executable instructions, when executed by the processor, cause the processor to:

receive the natural language utterance over a network from a user device.

11. The system of claim 10, wherein the executable instructions, when executed by the processor, cause the processor to:

send the API call over the network to the user device.

12. The system of claim 9, wherein the executable instructions, when executed by the processor, cause the processor to:

receive the natural language utterance locally from a user; and invoke a local service on the system using the API call.

13. The system of claim 9, wherein the executable instructions, when executed by the processor, cause the processor to:

receive the natural language utterance locally from a user; and invoke a remote service by sending the API call over a network to the remote service.

14. The system of claim 9, wherein the executable instructions, when executed by the processor, cause the processor to:

map the corresponding API parameters into a corresponding intermediate representation of the API call; and generate the API call by applying one or more conversion rules to the intermediate representation.

15. The system of claim 14, the intermediate representation comprising an API frame.

16. The system of claim 9, the encoder comprising a word embedding layer configured to map the tokens into vector representations that are provided to the activated individual decoders.

17. A computer-readable storage medium storing comprising executable instructions which, when executed by a processor of a machine, cause the machine to perform acts comprising:

obtaining an encoded utterance;

based at least on the encoded utterance, selecting two or more decoder modules from a plurality of decoder modules to decode the encoded utterance;

providing individual token representations of the encoded utterance to the selected two or more decoder modules;

receiving a plurality of application programming interface (API) parameters provided by the selected two or more decoder modules;

mapping the plurality of API parameters into an API call; and outputting the API call.

18. The computer-readable storage medium of claim 17, the acts further comprising:

selecting different sets of decoder modules to process different encoded utterances based at least on different token representations in the different encoded utterances.

19. The computer-readable storage medium of claim 18, the different token representations comprising word embeddings.

20. The computer-readable storage medium of claim 17, wherein outputting the API call comprises invoking a service by submitting the API call to the service.

* * * * *